UNITED STATES PATENT OFFICE.

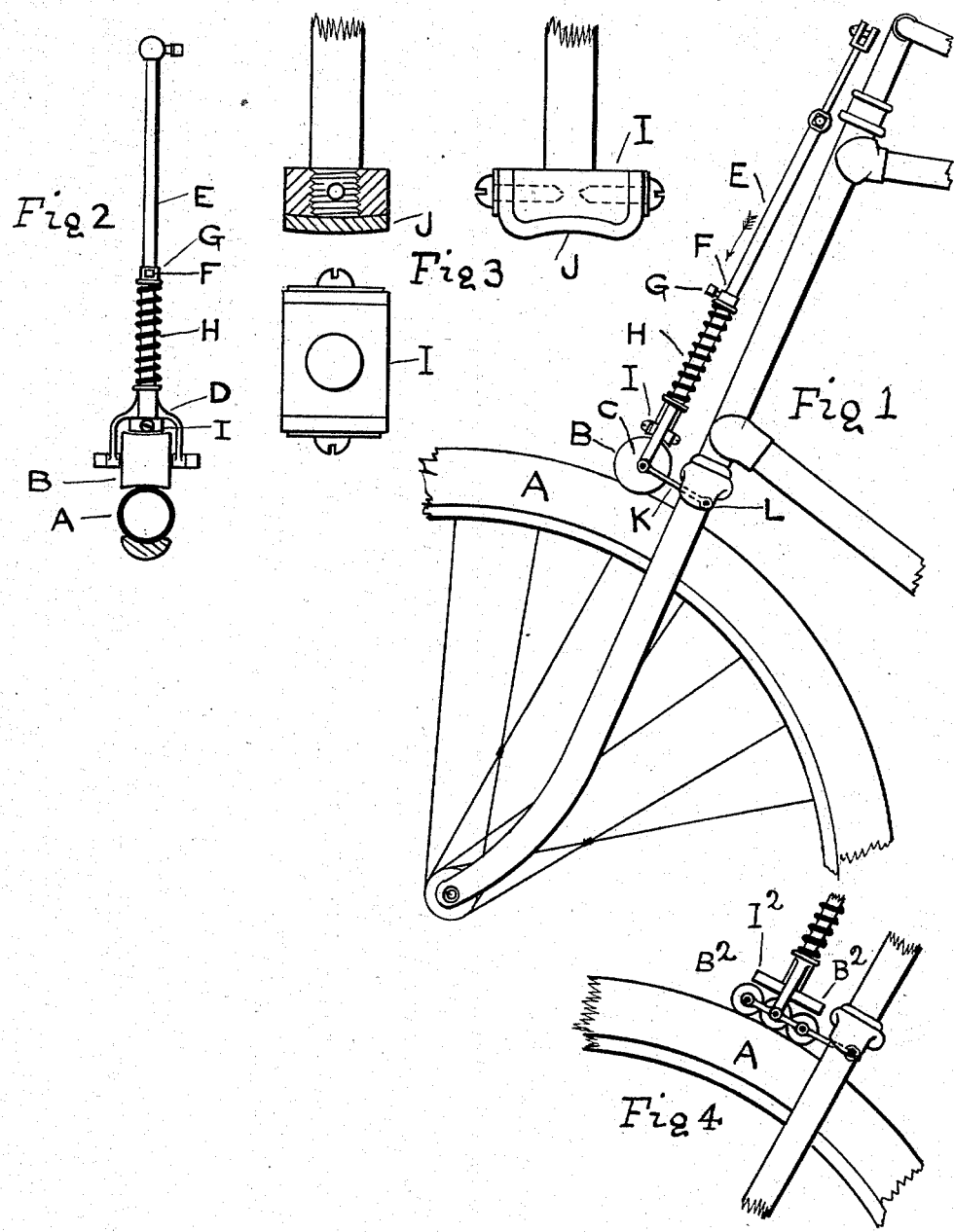

FRANCIS JOHN COLE, OF BALTIMORE, MARYLAND.

BICYCLE-BRAKE.

SPECIFICATION forming part of Letters Patent No. 527,479, dated October 16, 1894.

Application filed May 10, 1894. Serial No. 510,739. (No model.)

*To all whom it may concern:*

Be it known that I, FRANCIS JOHN COLE, of Baltimore city, in the State of Maryland, have invented a new and useful Improvement in Bicycle-Brakes, of which the following is a full, clear, and exact description.

The majority of brakes used on bicycles are made so that the brake shoe which comes in contact with the tire produces the friction by sliding, retarding the wheels from turning by means of sliding friction produced by forcing the brake-shoe in contact with the tire. These brake-shoes are usually constructed of thin, spoon-shaped, pieces of metal, hinged at one end, and forced downward by means of rods and levers conveniently extending to one end of the handle bar, within easy reach of the hand of the rider. The effect of brakes of this kind is to rapidly wear out the rubber tires used on this class of vehicles, the abrading action of which is much increased by the sand, dirt, &c., with which the surface is usually covered.

With the rapidly extending use of pneumatic tires, (which consist of a rubber hose into which air is pumped under pressure) the destructive abrading action of the sliding brake is sooner noticed, and in some instances to avoid this, the brake has been entirely removed from contact with the tire, and placed on an enlarged hub, or some portion other than that of the rubber tire.

The object of this invention is to produce a simple efficient brake which will produce the resistance necessary to retard the turning of the wheels by means of rolling instead of sliding friction, and is accomplished by using a revolving brake-shoe or roller arranged with mechanism, so that when the brake is applied a rubber block or brake-shoe is forced into contact with the hard smooth surface of the roller, with a lesser degree of force than the roller is forced against the tire. The effect of this is, that on gradually applying the brake, the roller is first brought into contact with the tire and partakes of the motion. If the pressure is now increased, the rubber is forced against the roller, gradually retarding its motion to the desired extent.

Referring to the drawings: Figure 1 represents in elevation the portion of the front of a bicycle with my improvement applied thereto. Fig. 2. represents a front view of my improved brake, the bicycle tire appearing in section. Fig. 3. represents various views of the rubber block. Fig. 4. represents a brake in which a number of rollers are employed.

It is evident that one or more rollers can be used and the same result obtained. The material used for the rollers is preferably vulcanized fiber, and the rubber block faced with gum, gutta percha, or any durable material which affords a high frictional resistance.

In Fig. 1, A is the tire; B, the roller; C, the axle or pivot of the roller; D, a yoke or frame surrounding the roller, through the opposite ends of which the pivot C passes; E, the push rod with the brake mechanism; F, the collar on the push rod, E; G, a set screw in collar F, used in fastening to any desired position; H, a helical spring wound around the rod, E; I, a rubber block fastened to the end of the push rod, E, and provided on the lower surface with the gum pad, J. K, is a connection hinging on the roller pivot C at one end, and at the other end on the pivot L.

The operation is as follows: Upon applying the brake, the push-rod E is forced down carrying the roller B against the tire A. When the |pressure exceeds the resistance of the spring H, the rubber block I with its pad J, is brought into contact with the brake roller B gradually retarding its motion, and giving any desired amount of braking force. As the pressure of the roller against the tire is always greater to the extent of the resistance of the spring H than the rubber block I on the roller, it follows that the roller never slides, but always revolves when in contact with the tire.

In Fig. 4 the operation of the brake is similar to that shown in Fig. 1, except that a number of rollers $B^2$ are employed, and the rubber block I extended so as to include all.

The advantage of this form of brake consists in the reduction of sliding and abrading action on the more expensive part, the tire, using rolling friction against the surface of the tire and transferring the sliding, braking force to the surface of the small and inexpensive rollers and their rubber.

I claim—

1. In a brake for bicycles, the combination of a roller or rollers, a roller yoke D and a substantially vertical rod E sliding through the yoke D, provided with a rubber block on its extreme end.

2. In a brake for bicycles, the combination of a roller or rollers, a roller yoke D, a substantially vertical rod E sliding through the yoke D, provided with a rubber block on its extreme lower end and a pivot connection K between the yoke D to the forks of the bicycle.

3. In a brake for bicycles, the combination of a roller or rollers, a roller yoke D and a substantially vertical rod E sliding through the yoke D, provided with a rubber block on its extreme lower end, a pivot connection K between the yoke D to the forks of the bicycle, and a spring bearing on the upper part of the yoke D.

FRANCIS JOHN COLE.

Witnesses:
ARTHUR EDWIN COLE,
J. H. ADAMS.